United States Patent
Heim (10) Patent No.: US 8,954,549 B2
(45) Date of Patent: Feb. 10, 2015

(54) AUTOMATIC DETECTION OF A NETWORK INTERFACE ON A HOST FOR ACCESSING NETWORKED STORAGE

(75) Inventor: Itamar Heim, Tel Aviv (IL)

(73) Assignee: Red Hat Israel, Ltd., Raanana (IL)

(*) Notice: Subject to any disclaimer, the term of this patent is extended or adjusted under 35 U.S.C. 154(b) by 522 days.

(21) Appl. No.: 12/795,042

(22) Filed: Jun. 7, 2010

(65) Prior Publication Data

US 2011/0302284 A1 Dec. 8, 2011

(51) Int. Cl.

| G06F 15/177 | (2006.01) |
| G06F 15/173 | (2006.01) |
| G06F 9/455 | (2006.01) |
| H04L 12/24 | (2006.01) |
| H04L 12/751 | (2013.01) |
| H04L 29/08 | (2006.01) |

(52) U.S. Cl.
CPC ............ *H04L 41/0816* (2013.01); *H04L 45/02* (2013.01); *H04L 67/1097* (2013.01)
USPC ............ 709/222; 709/223; 709/224; 709/238

(58) Field of Classification Search
USPC .................. 370/230, 232; 709/222, 223, 224
See application file for complete search history.

(56) References Cited

U.S. PATENT DOCUMENTS

| 5,519,689 A * | 5/1996 | Kim .............................. 370/232 |
| 5,964,840 A * | 10/1999 | Stevens et al. ................ 709/235 |
| 8,099,474 B2 * | 1/2012 | Thorpe et al. ................. 709/217 |
| 2006/0085522 A1 * | 4/2006 | Spry ............................. 709/220 |
| 2008/0155169 A1 * | 6/2008 | Hiltgen et al. ..................... 711/6 |
| 2010/0215019 A1 * | 8/2010 | Velev et al. ..................... 370/331 |
| 2011/0022694 A1 * | 1/2011 | Dalal et al. .................... 709/222 |

OTHER PUBLICATIONS

"Performance Evaluation of VMXNET3 Virtual Network Device"—VMWare, May 2009 http://www.vmware.com/pdf/vsp_4_vmxnet3_perf.pdf.*

* cited by examiner

*Primary Examiner* — Randy Scott
(74) *Attorney, Agent, or Firm* — Lowenstein Sandler LLP (57) ABSTRACT

A host computer is coupled to data storage and has access to the data storage. The host computer has multiple network interfaces, which are associated with multiple logical networks. The host computer detects a network address of the data storage, and identifies one of the network interfaces that is associated with a best-performing logical network for accessing the data storage. The host computer then receives a routing configuration that routes traffic to the data storage via the identified network interface.

20 Claims, 5 Drawing Sheets

AUTOMATIC DETECTION OF A NETWORK INTERFACE ON A HOST FOR ACCESSING NETWORKED STORAGE

TECHNICAL FIELD

Embodiments of the present invention relate to a networked computer system, and more specifically, to a networked computer system that is coupled to data storage over a network.

BACKGROUND

A networked storage is commonly used in a computer system that allows multiple servers to access a pool of storage devices. Sharing storage usually simplifies storage administration, since cables and storage devices do not have to be physically moved to shift storage from one server to another. There exist many forms of networked storage, such as Network Attached Storage (NAS), Storage Area Network (SAN), and Fibre Channel, etc.

A server cluster coupled to a network storage typically needs a high bandwidth and low latency connection to access the storage. Each server in the cluster is usually configured with a default setting which is based on the network topology. The default setting does not necessarily take into account the real time network performance when the server is in operation. Thus, the network performance for storage access may not be optimal.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for automatic detection of a network interface for storage access. In one embodiment, a host computer ("host") is coupled to data storage and has access to the data storage. The host has multiple network interfaces, which are associated with multiple logical networks. The host detects a network address of the data storage, and identifies one of the network interfaces that is associated with a best-performing logical network for accessing the data storage. The host then receives a routing configuration that routes traffic to the data storage via the identified network interface.

In one embodiment, the host may measure network characteristics of each of its logical networks. The network characteristics may include bandwidth, latency, number of hops to data storage, etc. The measurements may be made under different network conditions and may be repeated for better accuracy. Based on the measurements, the host determines the best-performing logical network and its associated network interface. This network interface is identified for storage access. As a result, the performance of storage access by the host can be improved.

Embodiments of the present invention improve the configuration of a computer system. Embodiments allow gathering information and calculating from the information a recommendation to the user (e.g., a system administrator) on which interface to use, or at least expose the information to the user to help him make an educated decision regaring the system configuration.

In the following description, numerous details are set forth. It will be apparent to one skilled in the art, however, that the present invention may be practiced without these specific details. In some instances, well-known structures and devices are shown in block diagram form, rather than in detail, in order to avoid obscuring the present invention.

Figure 1:
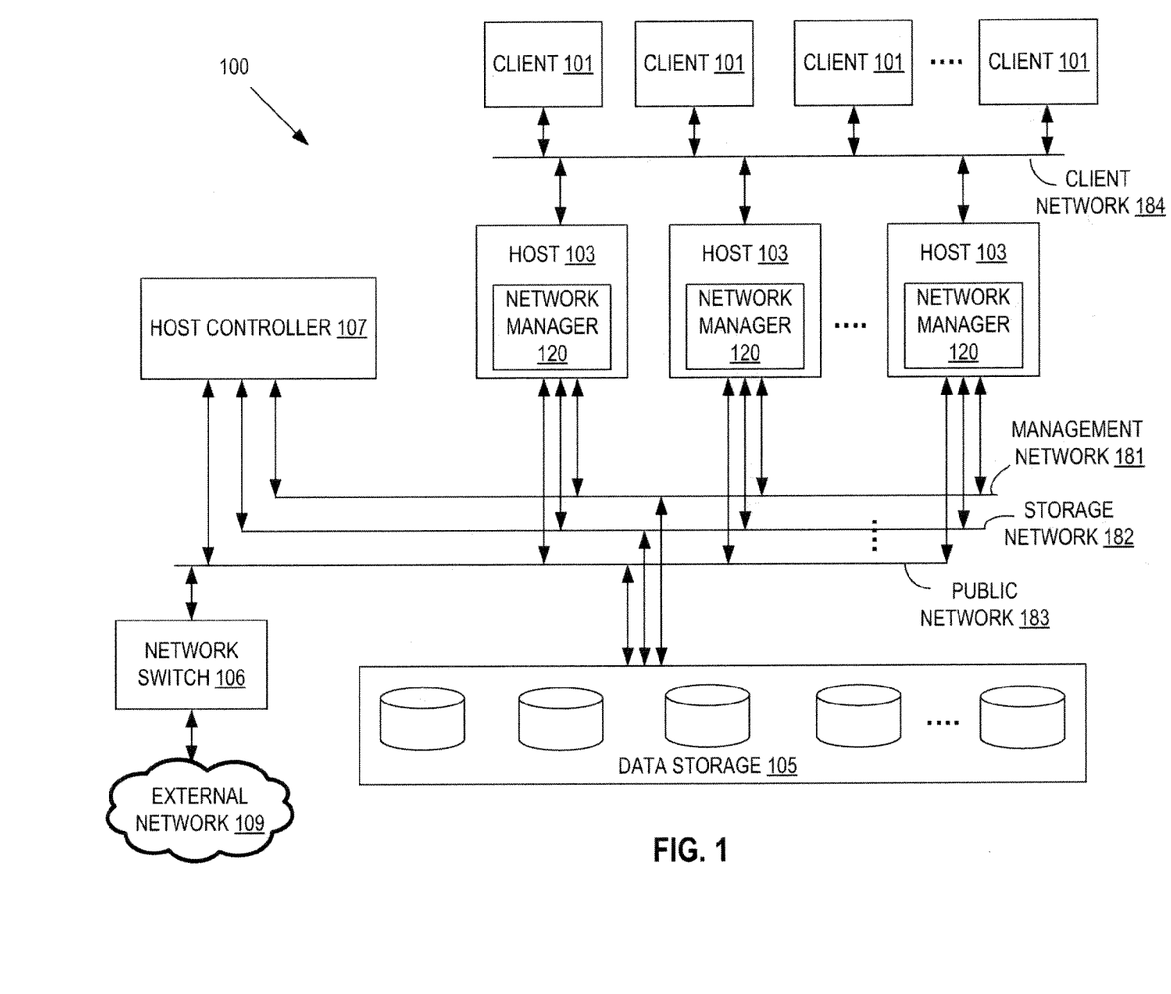
FIG. 1 is a block diagram illustrating one embodiment of host computers controlled by a host controller.

FIG. 1 illustrates an exemplary network architecture 100 in which embodiments of the present invention may operate. The network architecture 100 includes a cluster of host computers ("hosts") 103 coupled to a data storage 105, a host controller 107 and a network switch 106 via one or more physical networks (e.g., a local area network (LAN), a wide area network (WAN), intranet, etc.). The hosts 103 are also coupled to a number of clients 101, which may be authorized to access the services provided by the hosts 103. The physical networks may be configured to form multiple logical networks, e.g., a management network 181, a storage network 182, a public network 183, a client network 184, etc. The logical networks can be assigned by functionality and physical topology. In one embodiment, each of the logical networks may serve a different role, e.g., management, storage access, Internet access, display, etc. For example, the host controller 107 may send management packets to the hosts 103 via the management network 181, the hosts 103 may access the data storage 105 via the storage network 182, the hosts 103 may access an external network 109 (e.g., the Internet, another public or private network external to the cluster of hosts 103) via the network switch 106, and the hosts 103 may send display data to the clients 101 via the client network 184. Each logical network 181-184 may be a virtual local area network (VLAN) or an alternative type of logical network.

In one embodiment, the data storage 105 is a networked storage that is based on a network protocol such as Internet Small Computer System Interface (iSCSI), Network File System (NFS), etc. The data storage 105 may include mass storage devices, such as magnetic or optical storage based disks, tapes or hard drives, which form a storage pool shared by all of the hosts 103. During operation, the hosts 103 may frequently access the data in the data storage 105 via the storage network 182. Therefore, a system administrator may wish to configure the network architecture 100 such that the storage network 182 has the best performance among all of the logical networks coupled to and accessible by the hosts 103. In one embodiment, each host 103 includes a network manager 120 that identifies a network interface on the host 103 that is associated with the best-performing logical network for storage access. The network manager 120 then sends information of the identified network interface to the host controller 107. Based on the information, the host controller 107 may recommend to the system administrator an optimal configuration for the host 103 to access the data storage 105, or may automatically reconfigure the host 103 to use the identified network interface as the storage access interface.

Figure 2:
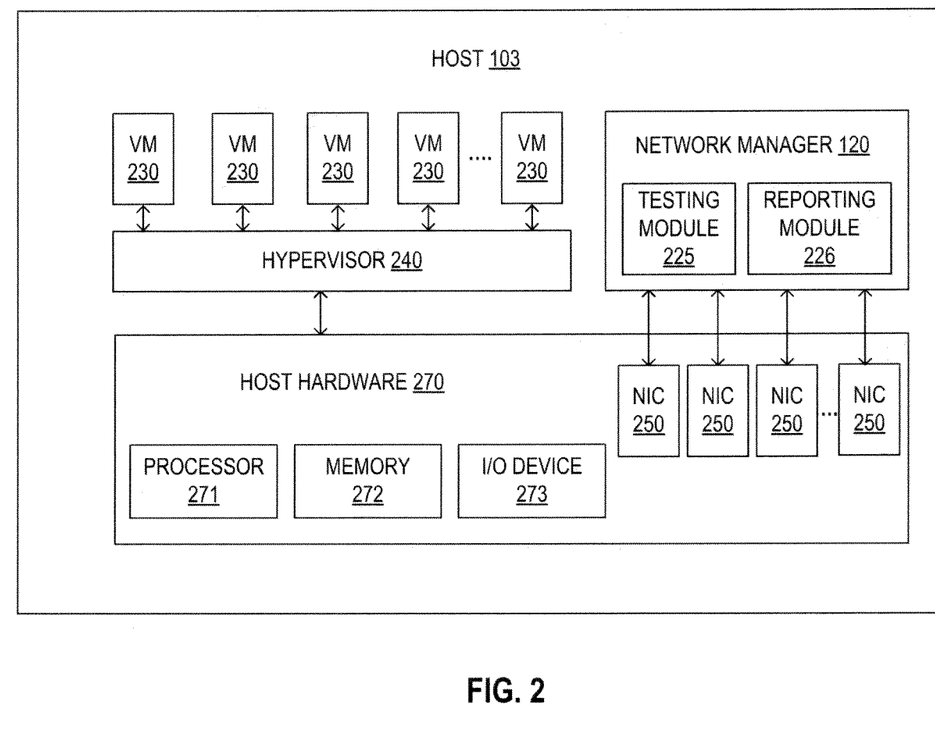
FIG. 2 is a block diagram illustrating one embodiment of a host computer of FIG. 1.

FIG. 2 illustrates an embodiment of the host 103 and the network manager 120. In one embodiment, the host 103 may host one or more virtual machines 230. Each virtual machine 230 is a software implementation of a machine (computer) that includes its own operating system (referred to as a guest operating system) and executes application programs. The guest operating systems on the virtual machines 230 are not necessarily the same. The guest operating systems may include Microsoft Windows®, Linux®, Solaris®, Mac® OS, etc. The virtual machines 230 may be accessible by the clients 101 over the client network 184. Each virtual machine 230 may frequently need data access to the data storage 105.

In the embodiment of FIG. 2, the host 103 allocates a certain amount of its resources to each of the virtual machines 230, and multiplexes its underlying hardware platform (referred to as host hardware 270) among the virtual machines 230. Each virtual machine 230 is then able to use the allocated resources to execute its guest operating system and applications. The software layer providing the virtualization is commonly referred to as a hypervisor 240 and is also known as a virtual machine monitor (VMM) or a kernel-based hypervisor. In one embodiment, the hypervisor 240 is part of a host operating system. The hypervisor 240 emulates the underlying hardware of the host 103, making the use of the virtual machine 230 transparent to the guest operating system and the user of the client 101.

In one embodiment, the host hardware 270 may include one or more processors 271, memory 272, one or more I/O devices 273, network interface cards (NICs) 250, etc.

In an alternative embodiment, the host 103 may provide service to the clients 101 without the use of virtual machines 230. It is understood that embodiments of the invention are not limited to virtualized computer systems and are equally applicable to non-virtualized computer systems.

According to one embodiment of the present invention, the network manager 120 in the host 103 includes a testing module 225 and a reporting module 226. The testing module 225 tests each of the logical networks coupled to the host 103 to identify a network interface that is associated with the best-performing logical network for storage access. Each network interface may be one of the network interface cards 250, a bonded set of network interface cards 250, or one or more other types of network interface controllers. In the following description, it is understood that the term "network interface card" is interchangeable with other forms of network interface hardware.

In one embodiment, the network manager 120 also includes the reporting module 226 to report the identified network interface to the host controller 107. In one embodiment, the performance of a logical network is measured by the bandwidth, latency, and number of hops to the data storage 105. Additional or alternative measurements may be used. In one embodiment, the measurements are made under a no-load condition (e.g., when the other hosts generate no traffic), and under a normal load condition (e.g., when all of the hosts are generating traffic under normal network usage). The measurements may be repeated multiple times for improved accuracy.

Figure 3:
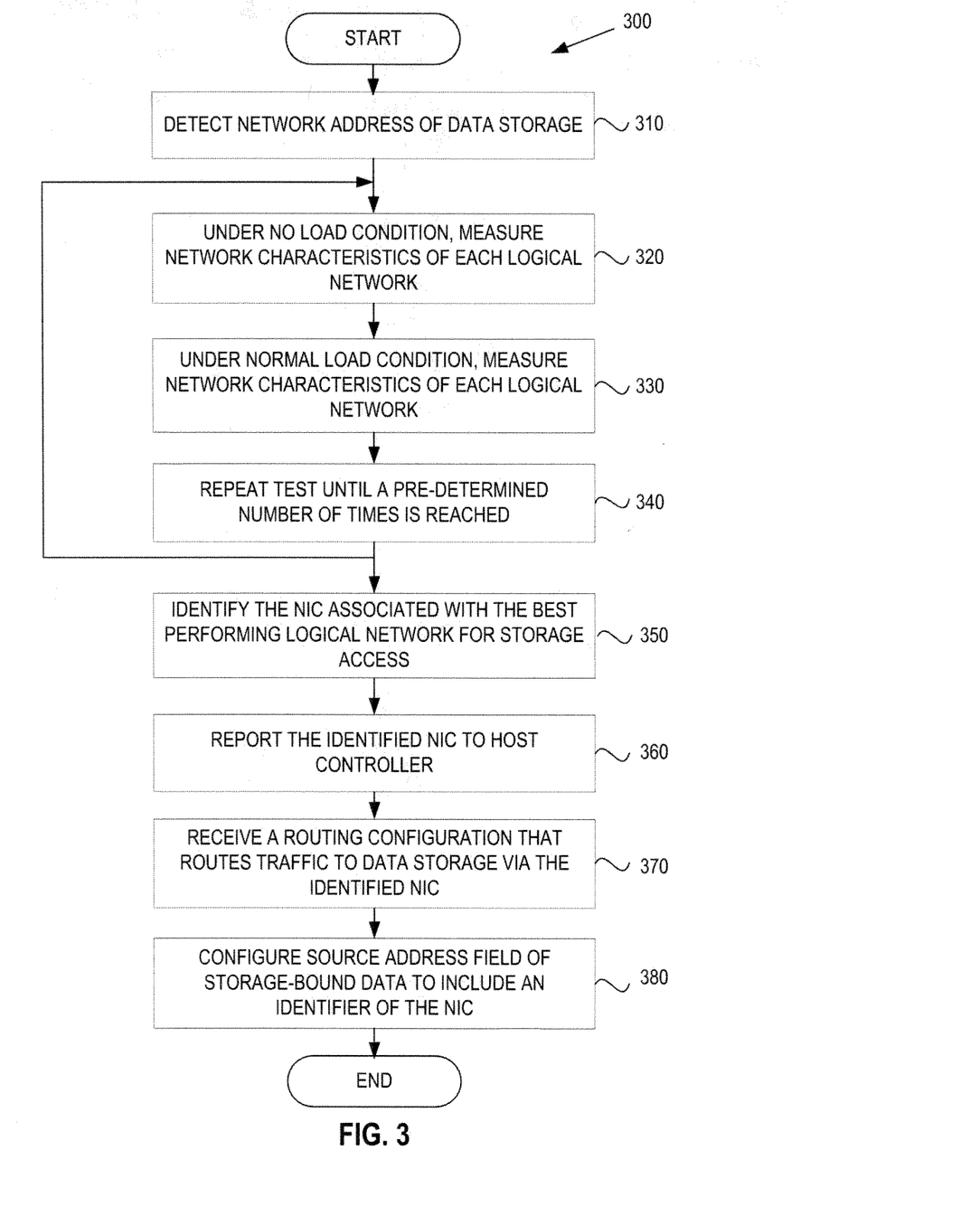
FIG. 3 is a flow diagram illustrating a method for identifying a network interface for storage access, in accordance with one embodiment of the present invention.

FIG. 3 is a flow diagram illustrating one embodiment of a method 300 for identifying a network interface for storage access. The method 300 may be performed by a computer system 500 of FIG. 5 that may comprise hardware (e.g., circuitry, dedicated logic, programmable logic, microcode, etc.), software (e.g., instructions run on a processing device), or a combination thereof. In one embodiment, the method 300 is performed by the network manager 120 in the host 103 (FIGS. 1 and 2).

Referring to FIG. 3, in one embodiment, the method 300 begins when the network manager 120 detects the network address of the data storage 105 (block 310). For example, the network manager may detect the Internet Protocol (IP) address that is encapsulated in the data packets sent from the data storage 105. Other methods of detecting the network address can also be used. The network manager 120 then starts measuring network characteristics of each of the logical networks that are coupled to the host 103 and the data storage 105. In one embodiment, the network manager 120 measures network characteristics of each of the logical networks under a no load condition (block 320). The no load condition refers to a condition when other hosts in the cluster do not generate any load (e.g., packets) in the logical networks. The network manager 120 also measures the network characteristics of each of the logical networks under a normal load condition (block 330). The normal load condition refers to a condition when all of the hosts in the cluster generate normal amount of traffic (as defined by normal network usage) in the logical networks. In one embodiment, the network manager 120 may combine the measurements made under the normal load condition and the no load condition to obtain a weighted measurement. The measurements under the no load condition and the normal load condition can be repeated for a predetermined number of times to obtain an averaged result for improved accuracy (block 340). It is understood that the measurements of blocks 320-340 can be performed in any order; e.g., the normal load condition can be measured before the no load condition. The method for measuring the network characteristics will be described in greater detail with reference to FIG. 4.

Based on the result of the measurements, the network manager 120 identifies a network interface (e.g., a network interface card or a bonded set of network interface cards) that is associated with the best-performing logical network among all of the logical networks connecting the host 103 to the data storage 105 (block 350). The network manager 120 then reports the identified network interface to the host controller 107 (block 360). The host controller 107 may recommend that a user (e.g., a system administrator) configure the identified network interface as the interface for storage access. Alternatively, if an automatic configuration option is set for the host 103, the host controller 107 may automatically configure the host 103 such that access to the data storage will be routed through the identified network interface. The configuration (also referred to as a "routing configuration") is sent by the host controller 107 and received by the host 103 to set the routing to the data storage 105 (block 370). The network manager 120 further configures the source address field of all storage-bound data packets to include an identifier (e.g., a media access control (MAC) address) of the identified network interface (block 380). Configuration of the source address field allows that reply packets from the data storage 105 will be routed through the identified network interface. The method 300 then terminates.

In one embodiment, the host 103 may be initially configured with a default setting that routes storage access through a network interface different from the identified network interface. With the measurements performed by the method 300, the host 103 may be re-configured with a network interface that is capable of providing an improved network performance for storage access.

Figure 4:
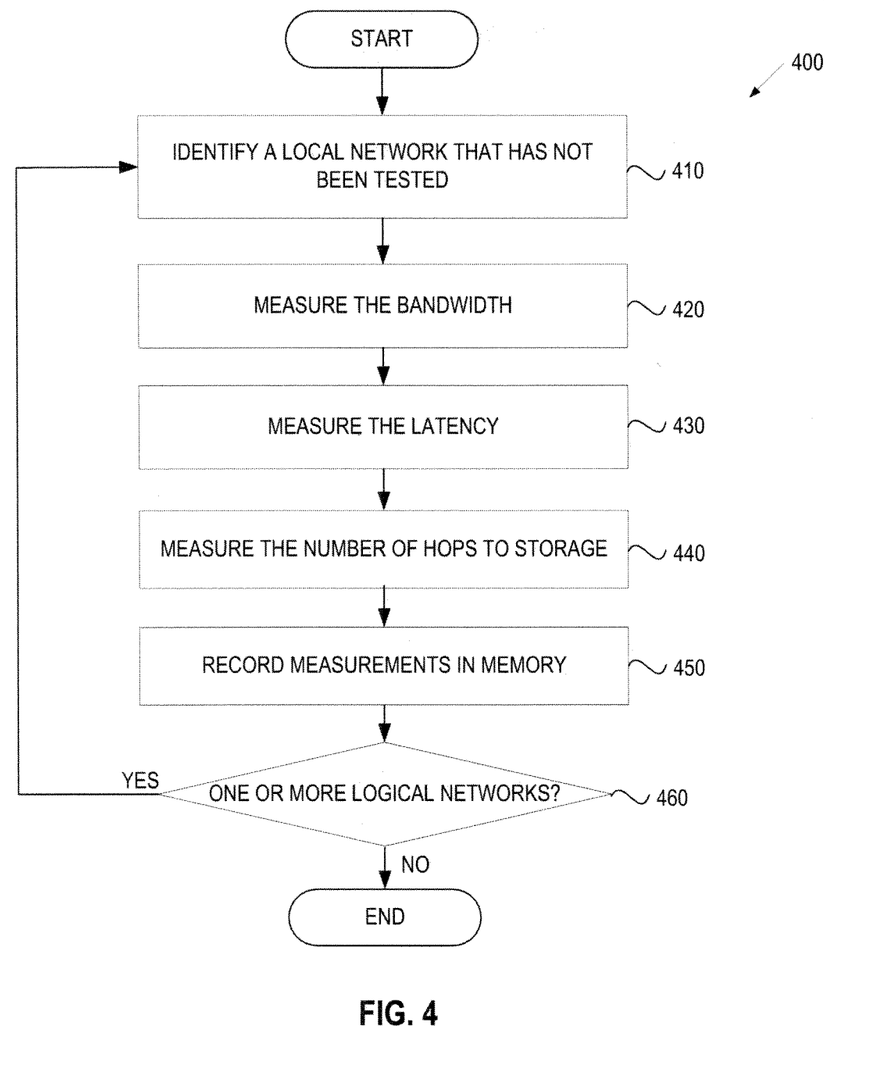
FIG. 4 is a flow diagram illustrating a method for measuring network characteristics, in accordance with one embodiment of the present invention.

FIG. 4 is a flow diagram illustrating one embodiment of a method 400 for measuring network characteristics. The method 400 may be performed by the computer system 500 of FIG. 5 that may comprise hardware (e.g., circuitry, dedicated logic, programmable logic, microcode, etc.), software (e.g., instructions run on a processing device), or a combination thereof. In one embodiment, the method 400 is performed by the network manager 120 (FIGS. 1 and 2).

Referring to FIG. 4, in one embodiment, the method 400 begins when the network manager 120 measures the network characteristics for each logical network coupled to the host 103. Initially, the network manager 120 identifies a logical network that has not been tested for its network characteristics (block 410). The network manager 120 then measures its bandwidth (block 420), latency (block 430), and the number of hops to the data storage (block 440). The network manager 120 may use existing mechanisms for measuring these characteristics; e.g., ping, traceroute, etc. The measurements at block 420-440 may be performed in any order, and additional measurements may be included. For example, the network manager 120 may determine whether the logical network is connected to the data storage 105 in the same network segment, and/or whether the existing network topology or other legacy consideration makes one logical network a better option than the other logical networks for storage access.

After the measurements are made, the network manager records the measurements in memory (block 450). If there are one or more logical networks coupled to the host 103 and the data storage 105 that have not been tested (block 460), the method 400 repeats from block 410. After all of the logical networks are tested, the method 400 terminates.

Figure 5:
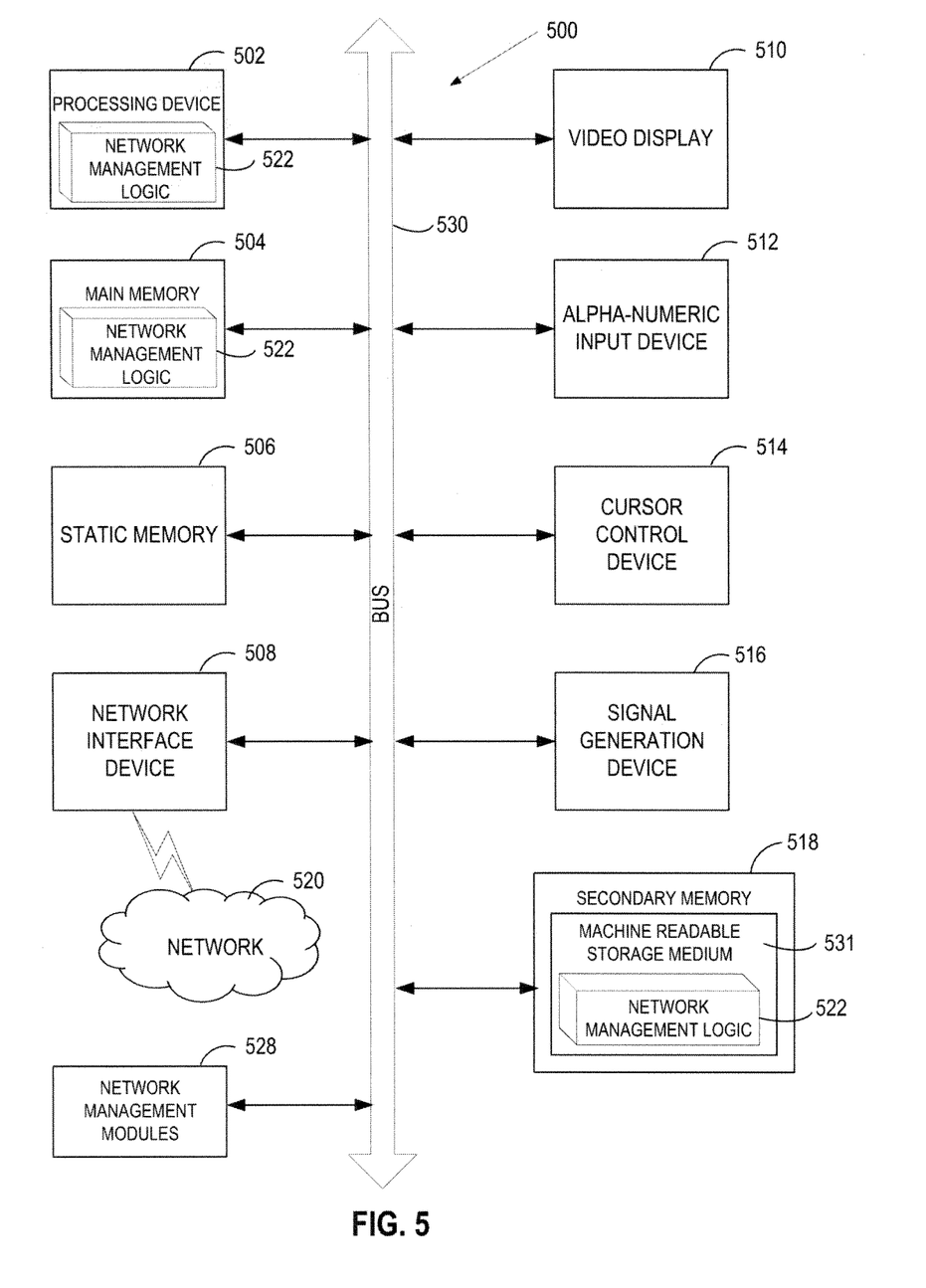
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute network management logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or, more specifically, a computer-readable storage medium) 531 on which is stored one or more sets of instructions (e.g., network management logic 522) embodying any one or more of the methodologies or functions described herein (e.g., the network manager 120 of FIGS. 1 and 2). The network management logic 522 may also reside, completely or at least partially, within the main memory 504 and/or within the processing device 502 during execution thereof by the computer system 500, the main memory 504 and the processing device 502 also constituting machine-readable storage media. The network management logic 522 may further be transmitted or received over a network 520 via the network interface device 508.

The machine-readable storage medium 531 may also be used to store the network management logic 522 persistently. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 500 may additionally include network management modules 528 for implementing the functionalities of the network manager 120 of FIGS. 1 and 2. The module 528, components and other features described herein (for example, in relation to FIG. 1) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "detecting", "identifying", "receiving", "recommending", "configuring", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   detecting, by a processing device of a host computer, a network address of a data storage coupled to the host computer, the host computer comprising a plurality of network interfaces associated with a plurality of logical networks;
   comparing, by the host computer, network characteristics of the plurality of logical networks, the network characteristics pertaining to an access to the data storage;
   identifying, by the host computer, one of the network interfaces that is associated with a best-performing logical network for accessing the data storage among the plurality of logical networks in view of a comparison of the network characteristics of the plurality of logical networks;
   providing data specifying the identified network interface to an entity; and
   receiving, by the host computer, a routing configuration recommended by the entity to access the data storage via the identified network interface.

2. The method of claim 1, wherein receiving a routing configuration further comprises:
   recommending the identified network interface to a user for access to the data storage.

3. The method of claim 1, wherein receiving a routing configuration further comprises:
   detecting that an automatic configuration option for the host computer is set; and
   automatically configuring the routing of the host computer for storage access without user intervention.

4. The method of claim 1, wherein comparing the network characteristics of the plurality of logical networks further comprises:
   measuring network characteristics of each of the logical networks, the network characteristics comprising one or more of the following: bandwidth, latency, or a number of hops to the data storage.

5. The method of claim 1, wherein each of the network interfaces comprises a network interface card.

6. The method of claim 1, wherein comparing the network characteristics of the plurality of logical networks further comprises:
   measuring network characteristics of each of the logical networks when other hosts generate no load in the logical networks to obtain a first measurement;
   measuring the network characteristics of each of the logical networks when the other hosts generate normal load in the logical networks to obtain a second measurement; and
   combining results of both the first measurement and the second measurement.

7. The method of claim 1, further comprising:
   configuring a source address field in a storage-bound data packet to include an indication of the identified network interface.

8. The method of claim 1, wherein the host computer hosts one or more virtual machines.

9. A system comprising:
   data storage; and
   a host computer coupled to the data storage, the host computer comprising a plurality of network interfaces associated with a plurality of logical networks, the host computer to detect a network address of the data storage, compare network characteristics of the plurality of logical networks, the network characteristics pertaining to an access to the data storage, identify one of the network interfaces that is associated with a best-performing logical network for accessing the data storage among the plurality of logical networks in view of a comparison of the network characteristics of the plurality of logical networks, provide data specifying the identified network interface to an entity, and receive a routing configuration recommended by the entity to access the data storage via the identified network interface.

10. The system of claim 9, further comprising:
a host controller coupled to the host computer, the host controller to receive the identified network interface from the host computer and to recommend the identified network interface to a user for access to the data storage.

11. The system of claim 9, further comprising:
a host controller coupled to the host computer, the host controller to detect that an automatic configuration option for the host computer is set and to automatically configure the routing of the host computer for storage access without user intervention.

12. The system of claim 9, wherein the host computer further comprises:
a network manager to measure network characteristics of each of the logical networks, the network characteristics comprising one or more of the following: bandwidth, latency, or a number of hops to the data storage.

13. The system of claim 9, wherein the host computer further comprises:
a network manager to measure network characteristics of each of the logical networks when other hosts generate no load in the logical networks and to measure the network characteristics of each of the logical networks when the other hosts generate normal load in the logical networks.

14. The system of claim 9, wherein the host computer further comprises:
a network manager to configure a source address field in a storage-bound data packet to include an indication of the identified network interface.

15. A non-transitory computer readable storage medium including instructions that, when executed by a processing device, cause the processing device to perform a method comprising:
detecting a network address of a data storage coupled to a host, the host comprising a plurality of network interfaces associated with a plurality of logical networks;
comparing, by the processing device, network characteristics of the plurality of logical networks, the network characteristics pertaining to an access to the data storage;
identifying one of the network interfaces that is associated with a best-performing logical network for accessing the data storage among the plurality of logical networks in view of a comparison of the network characteristics of the plurality of logical networks;
providing data specifying the identified network interface to an entity; and
receiving a routing configuration recommended by the entity to access the data storage via the identified network interface.

16. The computer readable storage medium of claim 15, wherein receiving a routing configuration further comprises:
recommending the identified network interface to a user for access to the data storage.

17. The computer readable storage medium of claim 15, wherein receiving a routing configuration further comprises:
detecting that an automatic configuration option for the host is set; and
automatically configuring the routing of the host for storage access without user intervention.

18. The computer readable storage medium of claim 15, wherein comparing the network characteristics of the plurality of logical networks further comprises:
measuring network characteristics of each of the logical networks, the network characteristics comprising one or more of the following: bandwidth, latency, or a number of hops to the data storage.

19. The computer readable storage medium of claim 15, wherein comparing the network characteristics of the plurality of logical networks further comprises:
measuring network characteristics of each of the logical networks when other hosts generate no load in the logical networks to obtain a first measurement;
measuring the network characteristics of each of the logical networks when the other hosts generate normal load in the logical networks to obtain a second measurement; and
combining results of both the first measurement and the second measurement.

20. The computer readable storage medium of claim 15, wherein the method further comprises:
configuring a source address field in a storage-bound data packet to include an indication of the identified network interface.

* * * * *